United States Patent
Xu et al.

(10) Patent No.: US 10,680,928 B2
(45) Date of Patent: Jun. 9, 2020

(54) MULTI-STREAM TRANSMISSION METHOD AND DEVICE IN SDN NETWORK

(71) Applicant: Huawei Technologies Co., Ltd., Shenzhen, Guangdong (CN)

(72) Inventors: Baolei Xu, Nanjing (CN); Haojun Zhou, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/140,247

(22) Filed: Sep. 24, 2018

(65) Prior Publication Data

US 2019/0028374 A1 Jan. 24, 2019

Related U.S. Application Data

(63) Continuation of application No. PCT/CN2017/073932, filed on Feb. 17, 2017.

(30) Foreign Application Priority Data

Mar. 25, 2016 (CN) .......................... 2016 1 0177868

(51) Int. Cl.
*H04L 12/26* (2006.01)
*H04L 12/715* (2013.01)
(Continued)

(52) U.S. Cl.
CPC .......... *H04L 43/0882* (2013.01); *H04L 41/12* (2013.01); *H04L 43/0805* (2013.01);
(Continued)

(58) Field of Classification Search
CPC . H04L 43/0882; H04L 41/12; H04L 43/0805; H04L 45/02; H04L 45/24; H04L 45/64
See application file for complete search history.

(56) References Cited

U.S. PATENT DOCUMENTS

| | | | |
|---|---|---|---|
| 2003/0165136 A1* | 9/2003 | Cornelius | ............... H04L 12/66 |
| 2014/0115650 A1 | 4/2014 | Zhang et al. | |
| 2016/0065476 A1 | 3/2016 | Reddy et al. | |

FOREIGN PATENT DOCUMENTS

| | | |
|---|---|---|
| CN | 102857478 A | 1/2013 |
| CN | 103346963 A | 10/2013 |

(Continued)

OTHER PUBLICATIONS

Xia Zhuoqun et al., "Study and Design of Adaptive Network Coding MPTCP in Wireless Mesh Networks", Computer Science, vol. 37, No. 4, Apr. 30, 2010, 8 pages.

(Continued)

*Primary Examiner* — Ronald B Abelson
(74) *Attorney, Agent, or Firm* — Fish & Richardson P.C.

(57) ABSTRACT

The present disclosure relates to the field of communications technologies, and provides a multi-stream transmission method and device in an SDN network. A server obtains network status information of a network by using an SDN controller; determines, according to the network status information and a data sending rate requirement of a client, a quantity of sub-streams and a sub-stream transmission path that are required by a multi-stream connection, and allocates corresponding sub-stream identification information to each sub-stream; and sends the determined sub-stream transmission path and the corresponding sub-stream identification information to the SDN controller. According to the foregoing solution, the server completes multi-stream connection path planning according to the network status information, and the SDN controller only provides the network status information for the server without performing the multi-stream connection path planning, so that calculation load of the SDN controller is reduced.

13 Claims, 6 Drawing Sheets

(51) Int. Cl.
    *H04L 12/707*   (2013.01)
    *H04L 12/24*    (2006.01)
    *H04L 12/751*   (2013.01)
    *H04L 12/721*   (2013.01)
(52) U.S. Cl.
    CPC .............. *H04L 45/02* (2013.01); *H04L 45/24* (2013.01); *H04L 45/64* (2013.01); *H04L 45/124* (2013.01)

(56) References Cited

FOREIGN PATENT DOCUMENTS

| CN | 104023408 A | 9/2014 |
| CN | 104468636 A | 3/2015 |
| CN | 105282169 A | 1/2016 |
| CN | 105337857 A | 2/2016 |

OTHER PUBLICATIONS

Jingpu Duan et al., "Responsive Multipath TCP in SDN-based Datacenters", 2015 IEEE International Conference on Communications (ICC), Sep. 10, 2015, 6 pages.
A. Ford et al., "TCP Extensions for Multipath Operation with Multiple Addresses", Internet Engineering Task Force, RFC 6824, Jan. 2013, 64 pages.
"Applied Research Center for Computer Networks", Moscow State University, Published in: Technology, Aug. 5, 2013, 10 pages.
Marcus Sandri, et al., "On the Benefits of Using Multipath TCP and Openflow in Shared Bottlenecks," 2015 IEEE 29th International Conference on Advanced Information Networking and Applications, IEEE Computer Society, Mar. 24, 2015, 8 pages, XP32771816.
Sana Habib, et al., "The Past, Present, and Future of Transport-Layer Multipath," arXiv:1601.06043v1 [cs.NI], Jan. 22, 2016, 22 pages, XP80679858.
Chinese Office Action issued in Chinese Application No. 201610177868.8 dated Apr. 16, 2019, 11 pages.

* cited by examiner

MULTI-STREAM TRANSMISSION METHOD AND DEVICE IN SDN NETWORK

CROSS-REFERENCE TO RELATED APPLICATIONS

This application is a continuation of International Application No. PCT/CN2017/073932 filed on Feb. 17, 2017, which claims priority to Chinese Patent Application No. 201610177868.8 filed on Mar. 25, 2016, the disclosures of which are hereby incorporated by reference in their entireties.

TECHNICAL FIELD

The present disclosure relates to the field of communications technologies, and in particular, to a multi-stream transmission method and device in an SDN network.

BACKGROUND

As an ultra high definition video (for example, 4K requires 15 Mbps to 30 Mbps bandwidth, and 8K requires 100 Mbps to 180 Mbps bandwidth) is gradually popular, when a server provides a streaming media service for a client, a transmission rate requirement of the ultra high definition video cannot be satisfied if only a single transmission path is used. One way to resolve such a problem is to use multiple paths to simultaneously provide a data transmission service for a user. MPTCP (Multipath TCP) is a multipath transmission protocol at a transport layer, and currently, has been in large-scale commercial use in an Apple iOS 7 system. When a transmit end and a receive end include multiple network interfaces (IP addresses), the technology may be used to simultaneously establish multiple sub-streams (TCP links) between different network interfaces to simultaneously send data, so as to improve utilization of idle bandwidth on a network and an end-to-end transmission rate.

SDN (software-defined networking) is a new network innovation architecture, and a core idea of the SDN is to separate a network device control plane from a forwarding plane, so as to flexibly control traffic, and provide an excellent platform for a core network and application innovation. An SDN network includes a network device (for example, a router) and an SDN controller. The SDN controller is configured to: generate a flow table (Flow Table) according to a user configuration or a dynamically running protocol, and send the flow table to the network device. The network device is configured to: receive the flow table from the SDN controller, and match and process a packet according to the flow table.

The prior art (Flow DeMultiplexing Protocol, FDMP) is a technology improved based on MPTCP. The technology uses a network status collection function and a fine transmission path control function of an SDN controller to transmit data between hosts with a single IP address and multiple ports by using multiple streams, and implement accurate control over each sub-stream transmission path, so that path overlapping between multiple sub-streams of a same multi-stream connection is minimum, thereby reducing a possibility that the multiple sub-streams share one transmission path.

However, in the prior art, the SDN controller is overloaded. As a control center of an entire network, the SDN controller not only needs to plan a path for each sub-stream of a multi-stream connection, but also needs to plan a path for another type of connection. Consequently, the SDN controller may become a performance bottleneck of an SDN network.

SUMMARY

The present disclosure provides a multi-stream transmission method and device in an SDN network, so as to resolve a prior-art technical problem that an SDN controller is overloaded in a multi-stream transmission scheme based on the SDN network.

To achieve the foregoing objective, embodiments of the present disclosure use the following technical solutions:

According to a first aspect, a multi-stream transmission method in an SDN controller is provided, where the method includes: obtaining, by a server, network status information of a network by using an SDN controller; determining, according to the network status information and a data sending rate requirement of a client, a quantity of sub-streams and a sub-stream transmission path that are required by a multi-stream connection, and allocating corresponding sub-stream identification information to each sub-stream; and sending, by the server, the determined sub-stream transmission path and the corresponding sub-stream identification information to the SDN controller. The server completes multi-stream connection path planning according to the network status information, and the SDN controller only provides the network status information for the server without performing the multi-stream connection path planning, so that calculation load of the SDN controller is reduced. In addition, the server performs the multi-stream connection path planning according to the network status information, so that the quantity of sub-streams can be more efficiently adjusted in a data transmission process to satisfy the sending rate requirement of the client.

With reference to the first aspect, in a first possible implementation of the first aspect, the network status information includes a network topology and an available bandwidth and a delay that are of a link that is between adjacent network devices and that is in the network topology; and the determining, according to the network status information and a data sending rate requirement of a client, a quantity of sub-streams and a sub-stream transmission path that are required by a multi-stream connection is specifically: calculating, by the server, a cost of each link in the network topology according to the available bandwidth and the delay that are of the link in the network topology; determining a first transmission path according to the cost of each link in the network topology, adding the first transmission path to a temporary path library, and determining whether an available bandwidth of a transmission path in the temporary path library is greater than a transmission rate threshold, where the transmission rate threshold is determined by the sending rate requirement, and the transmission rate threshold is greater than the sending rate requirement; if the available bandwidth of the transmission path in the temporary path library is greater than the transmission rate threshold, ending a procedure, or if the available bandwidth of the transmission path in the temporary path library is not greater than the transmission rate threshold, performing an iterative step, where the iterative step is specifically: updating the cost of each link in the network topology according to the transmission path in the temporary path library, determining another transmission path according to an updated cost of each link, and determining whether a sum of an available bandwidth of the another transmission path and the available bandwidth of the transmission path in the temporary path library is greater than the transmission rate threshold; and if the sum of the available bandwidth of the another transmission path and the available bandwidth of the transmission path in the temporary path library is greater than the transmission rate threshold, ending a procedure, or if the sum of the available bandwidth of the another transmission path and the available bandwidth of the transmission path in the temporary path library is not greater than the transmission rate threshold, repeatedly performing the iterative step until the sum of the available bandwidth of the another transmission path and the available bandwidth of the transmission path in the temporary path library is greater than the transmission rate threshold. The server obtains the network status information of the SDN network by using the SDN controller, and plans a transmission path based on the status information of the SDN network and the transmission rate threshold. Because a bandwidth estimation method is used to make decisions on a quantity of sub-streams and a sub-stream transmission path, there is no need to wait until all sub-streams are established one by one to make a decision on whether to add a new sub-stream, thereby avoiding wait time of multiple TCP slow start processes. Therefore, a decision process is faster.

In a possible design, because a network status change is a dynamic process, an available bandwidth of a path may suddenly decrease during network congestion, and the available bandwidth of the path may increase when other data transmission on a path ends. Therefore, a quantity of sub-streams and a transmission path that are determined when multi-stream transmission is just established may no longer satisfy a requirement for the transmission rate threshold after a period of time. In this case, the quantity of sub-streams and the transmission path need to be dynamically adjusted. Specifically, the server periodically obtains an actual transmission rate of multi-stream transmission.

When the actual transmission rate of multi-stream transmission is greater than a sub-stream deletion transmission rate threshold, the server determines, if a requirement for the transmission rate threshold is satisfied, a quantity of sub-streams and a sub-stream path that need to be closed; and sends the closed sub-stream path and corresponding sub-stream identification information to the SDN controller; or when the actual transmission rate of multi-stream transmission is less than a sub-stream addition transmission rate threshold, the server determines, if a requirement for the transmission rate threshold is satisfied, a quantity of sub-streams and a sub-stream path that need to be added; allocates corresponding sub-stream identification information to each added sub-stream; and sends the added sub-stream path and the corresponding sub-stream identification information to the SDN controller.

In a possible design, the calculating, by the server, a cost of each link in the network topology according to the available bandwidth and the delay that are of the link in the network topology is specifically:

$$O(D_i, B_i) = a_1 \times D_i + (1-a_1)/B_i, \text{ where}$$

$O(D_i, B_i)$ is a cost of a link $L_i$, $a_1$ is a constant greater than or equal to 0 and less than or equal to 1, $D_i$ is a delay of the link $L_i$, and $B_i$ is an available bandwidth of the link $L_i$. An optimal transmission path may be planned for data transmission by calculating the cost of each link in the SDN network, thereby improving data transmission efficiency.

According to a second aspect, an embodiment of the present disclosure provides a multi-stream transmission server in an SDN network, and the server has a function of implementing a server behavior in the first aspect. The function may be implemented by using hardware, or may be implemented by executing corresponding software by hardware. The hardware or the software includes one or more modules corresponding to the function.

In a possible design, a structure of the server includes a processor and a memory. The memory is configured to store a program that supports the server in performing the foregoing method. The processor is configured to execute the program stored in the memory. The server may further include a communications interface used for communication between the server and another device or a communications network.

According to a third aspect, an embodiment of the present disclosure provides a computer storage medium. The computer storage medium is configured to store a computer software instruction used by the server, and includes a program designed for the server to execute the foregoing aspects.

Compared with the prior art, according to the solutions provided in the present disclosure, the server completes multi-stream connection path planning according to the network status information, and the SDN controller only provides the network status information for the server without performing the multi-stream connection path planning, so that calculation load of the SDN controller is reduced. In addition, the server performs the multi-stream connection path planning according to the network status information, so that the quantity of sub-streams can be more efficiently adjusted in a data transmission process to satisfy the sending rate requirement of the client.

These aspects or other aspects of the present disclosure will be more simple and easy to understand in the following embodiments.

DETAILED DESCRIPTION

To make the objectives, technical solutions, and advantages of the present disclosure clearer, the following further describes the embodiments of the present disclosure in detail with reference to the accompanying drawings.

Figure 1:
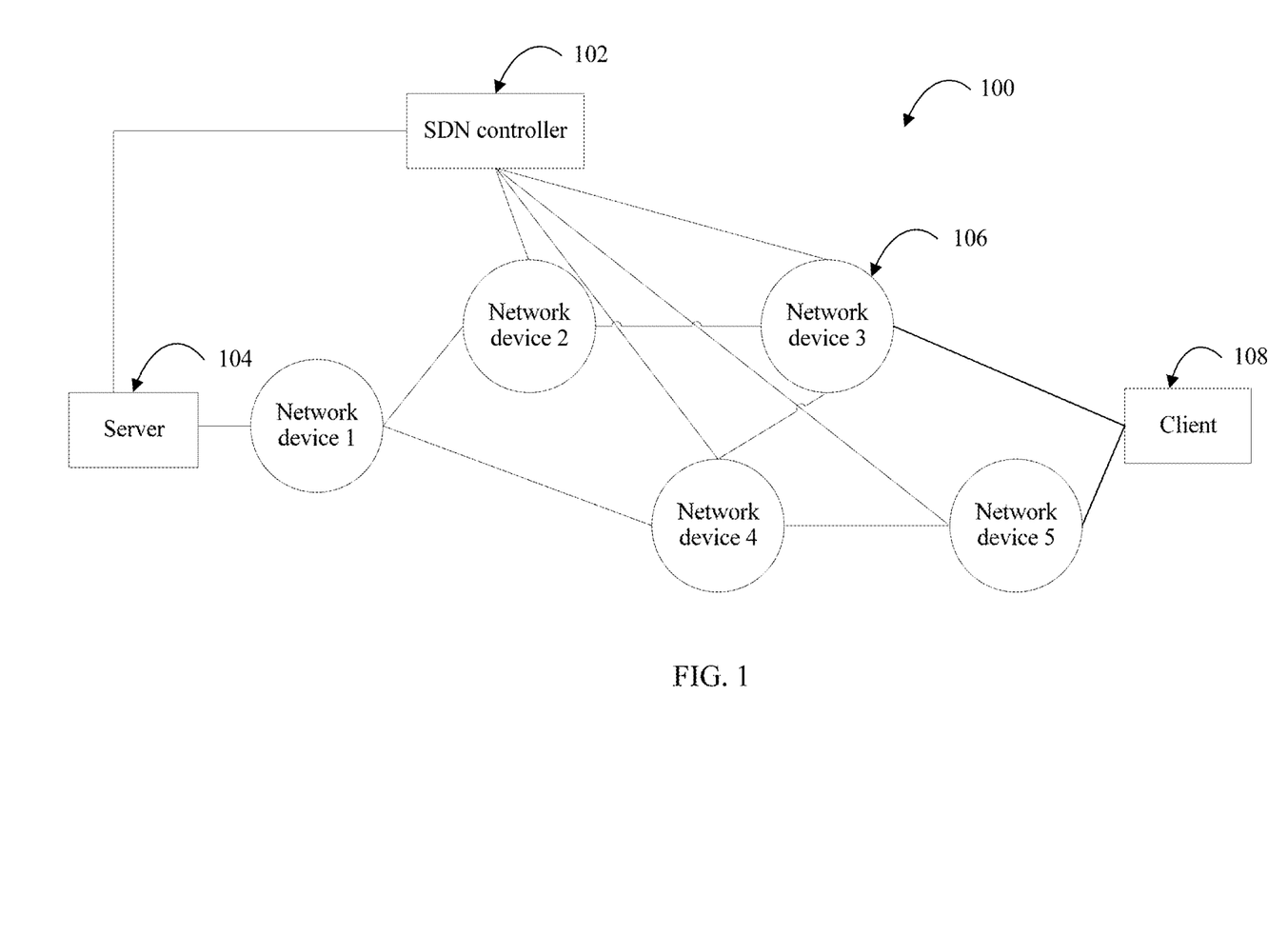
FIG. 1 is a multi-stream transmission system architecture in an SDN network according to an embodiment of the present disclosure.

FIG. 1 describes a multi-stream transmission system architecture in an SDN network according to an embodiment of the present disclosure. The multi-stream transmission system architecture 100 in the SDN network includes an SDN controller 102, a server 104, a network device 106

(such as a network device 1, a network device 2, and a network device 3), and a client 108. The client 108 may be any device that supports the MPTCP protocol, such as a PC, an iPad, and a mobile phone. The network device 106 may be a device that is responsible for a data forwarding function in the SDN network, such as an SDN router and an SDN switch. The SDN controller is a core component in the SDN network, communicates with a network device in the SDN network by using a southbound interface, centrally controls data forwarding of the network device, and in addition, communicates with the server by using a northbound interface, and provides a network invoking capability for the server.

In this embodiment of the present disclosure, by using an uplink channel of the southbound interface, the SDN controller centrally monitors and collects statistics on information reported by the network device 106, so as to obtain network status information. The server 104 obtains, by using the northbound interface of the SDN controller, the network status information obtained by the SDN controller; determines, according to the network status information and a data sending rate requirement of the client, a quantity of sub-streams and a sub-stream transmission path that are required by a multi-stream connection, and allocates corresponding sub-stream identification information to each sub-stream; and sends the determined sub-stream transmission path and the corresponding sub-stream identification information to the SDN controller 102 by using the northbound interface. Finally, the SDN controller 102 delivers, by using a downlink channel of the southbound interface, a corresponding entry to a related network device 106 according to the determined sub-stream transmission path and the corresponding sub-stream identification information.

In this embodiment of the present disclosure, the server completes multi-stream connection path planning according to the network status information, and the SDN controller only provides the network status information for the server without performing the multi-stream connection path planning, so that calculation load of the SDN controller is reduced. In addition, the server 104 performs the multi-stream connection path planning according to the network status information, so that the quantity of sub-streams can be more efficiently adjusted in a data transmission process to satisfy the sending rate requirement of the client.

Figure 2:
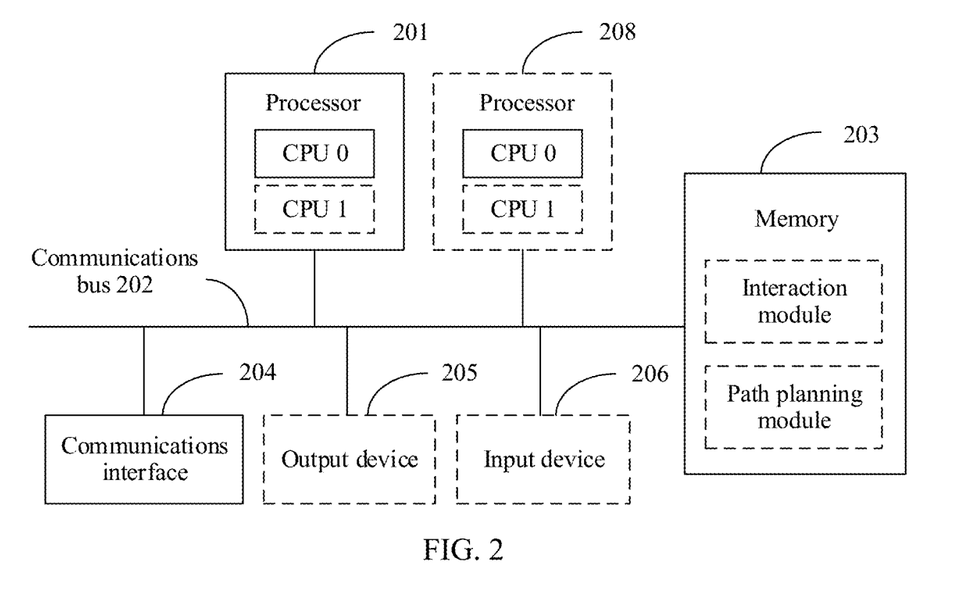
FIG. 2 is a schematic diagram of a computer device according to an embodiment of the present disclosure.

As shown in FIG. 2, the server in FIG. 1 may be implemented by using a computer device (or a system) in FIG. 2.

FIG. 2 shows a schematic diagram of the computer device according to an embodiment of the present disclosure. The computer device 200 includes at least one processor 201, a communications bus 202, a memory 203, and at least one communications interface 204.

The processor 201 may be a general purpose central processing unit (CPU), a microprocessor, an application-specific integrated circuit (application-specific integrated circuit, ASIC), or one or more integrated circuits configured to control program execution in the solution of the present disclosure.

The communications bus 202 may include a channel used to transfer information between the foregoing components. The communications interface 204 is configured to use any transceiver apparatus to communicate with another device or a communications network, such as Ethernet, a radio access network (RAN), or a wireless local area network (WLAN).

The memory 203 may be a read-only memory (ROM) or another type of static storage device that may store static information and instructions, or a random access memory (RAM) or another type of dynamic storage device that may store information and instructions; or may be an electrically erasable programmable read-only memory (EEPROM), a compact disc read-only memory (CD-ROM), another compact disc storage, an optical disc storage (including a compact disc, a laser disc, an optical disc, a digital versatile disc, a Blu-ray disc, and the like), a disk storage medium, another magnetic storage device, or any other medium that can be configured to carry or store expected program code in a form of an instruction or a data structure and that can be accessed by a computer. However, this is not limited herein. The memory may independently exist and be connected to the processor by using the bus. Alternatively, the memory may be integrated with the processor.

The memory 203 is configured to store program code used to execute the solution of the present disclosure, and the processor 201 controls execution of the program code. The processor 201 is configured to execute the program code stored in the memory 203.

In specific implementation, in an embodiment, the processor 201 may include one or more CPUs, such as a CPU 0 and a CPU 1 in FIG. 2.

In specific implementation, in an embodiment, the computer device 200 may include multiple processors, such as the processor 201 and a processor 208 in FIG. 2. Each of these processors may be a single-core (single-CPU) processor or may be a multi-core (multi-CPU) processor. The processor herein may be one or more devices, circuits, and/or processing cores configured to process data (for example, a computer program instruction).

In specific implementation, in an embodiment, the computer device 200 may further include an output device 205 and an input device 206. The output device 205 communicates with the processor 201, and may display information in multiple manners. For example, the output device 205 may be a liquid crystal display (LCD), a light emitting diode (LED) display device, a cathode-ray tube (CRT) display device, a projector (projector), or the like. The input device 206 communicates with the processor 201, and may receive user's input in multiple manners. For example, the input device 206 may be a mouse, a keyboard, a touchscreen device, a sensing device, or the like.

The computer device 200 may be a general purpose computer device or a special purpose computer device. In specific implementation, the computer device 200 may be a desktop computer, a portable computer, a network server, a personal digital assistant (PDA), a mobile phone, a tablet computer, a wireless terminal device, a communications device, an embedded device, or a device with a structure similar to that in FIG. 2. A type of the computer device 200 is not limited in this embodiment of the present disclosure.

The server shown in FIG. 1 may be the device shown in FIG. 2. The memory of the server stores one or more software modules (such as an interaction module and a path planning module). The server may implement the software modules by using the processor and the program code in the memory, so as to transmit data to the client by using multiple sub-streams.

Figure 3:
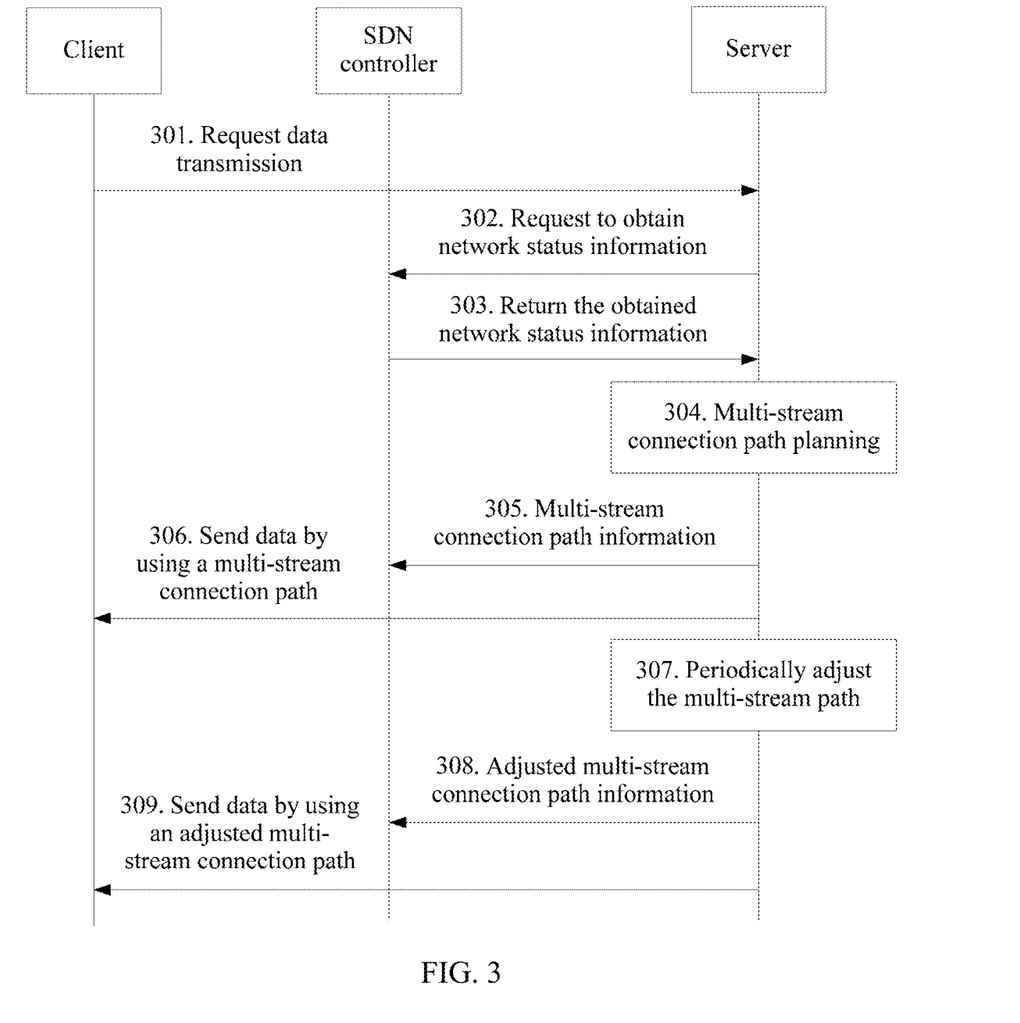
FIG. 3 is a schematic diagram of a multi-stream transmission method in an SDN network according to an embodiment of the present disclosure.

Based on the system architecture diagram shown in FIG. 1, a process in which a client transmits data to a client by using multiple streams is described more clearly. For example, FIG. 3 shows a multi-stream transmission method in an SDN network according to an embodiment of the present disclosure, and the method includes the following steps.

Step 301: A client sends a data transmission request message to a server, for example, requests to transmit a video slice 100 of a movie "Avatar".

It should be noted that path planning of the request message sent by the client to the server is completed by an SDN controller. This is the same as that in the prior art. Details are not described herein.

Step 302: The server receives the data transmission request message of the client, and requests network status information from an SDN controller.

Specifically, the network status information includes a network topology and an available bandwidth and a delay that are of a link that is between adjacent network devices and that is in the network topology. For example, the server may query the network status information by using a northbound interface of a REST API type provided by the SDN controller. Assuming that an IP address of the SDN controller is 192.168.0.1, an interface used to obtain the network topology may be curl http://192.168.0.1:8080/wm/topology/links/j son.

Step 303: The SDN controller returns the network status information to the server.

Specifically, the SDN controller may return, to the server by using an uplink channel of the northbound interface, the network status information requested by the server. For example, when the server side sends a query command curl http://192.168.0.1:8080/wm/topology/links/j son to the SDN controller by using the northbound interface of the REST API type, the SDN controller returns network topology information to the server.

Step 304: The server determines, according to the network status information and a data sending rate requirement of the client, a quantity of sub-streams and a sub-stream transmission path that are required by a multi-stream connection, and allocates corresponding sub-stream identification information to each sub-stream.

Specifically, the server determines the data sending rate requirement according to the request message of the client. For example, the client expects to request the video slice 100 of "Avatar", and the server determines that a transmission rate requirement of video sending is 50 Mbps after receiving the request, so as to achieve a specific view effect.

The sub-stream identification information is determined by an IP address of the server, a port number of the server, an IP address of the client, and a port number of the client. For example, a server 192.168.1.1 transmits data to a port 80 of a client 192.168.1.2, and if the server determines, according to the network status information and the data sending rate requirement of the client, that three sub-streams are required for data transmission, and the server includes three idle ports 1234, 1235, and 1236, identifiers of the three sub-streams may be (192.168.1.1, 1234, 192.168.1.2, 80), (192.168.1.1, 1235, 192.168.1.2, 80), and (192.168.1.1, 1236, 192.168.1.2, 80). It should be noted that the IP address and port information that are of the client may be determined by the server according to the data transmission request message received in step 302.

The determining, by the server according to the network status information and a data sending rate requirement of the client, a quantity of sub-streams and a sub-stream transmission path that are required by a multi-stream connection specifically includes: planning, by the server according to the network status information and the data sending rate requirement of the client, a transmission path from the server to the client for a packet sent by the server to the client, where there may be one or more transmission paths.

Step 305: The server sends, to the SDN controller, the sub-stream transmission path and the corresponding sub-stream identification information that are determined in step 304, so that the SDN controller configures a related network device.

Specifically, the server sends, to the SDN controller by using the northbound interface of the SDN controller, the sub-stream transmission path and the corresponding sub-stream identification information that are determined in step 304, so that the SDN controller configures the related network device. The SDN controller configures all network devices on all sub-stream transmission paths, so that a packet planned to the sub-stream can be transmitted on the transmission path. For example, if the SDN controller configures a network device 00:00:00:00:00:00:00:01 to forward, to a next network device by using a port 2 of the network device, a sub-stream whose source IP address is 4.3.2.1 (an IP address of a server), source port is 1234 (which is identification information of a sub-stream), destination IP address is 1.2.3.4 (an IP address of a client), and destination port is 1234 (a port of the client), a related command of the northbound interface of the REST API type is curl -d '{"switch": "00:00:00:00:00:00:00:01", "name": "flow-mod-1", "priority":"32768", "src-ip":"4.3.2.1", "dst-ip":"1.2.3.4", "src-port":"1234", "dst-port":"1234", "active":"true", "actions":"output=2"}' http://192.168.0.1:8080/wm/staticflowentrypusher/j son. After receiving a fault command, the SDN controller may deliver a corresponding forwarding policy to the network device 00:00:00:00:00:00:00:01 by using a southbound interface.

Step 306: The server plans to-be-sent data to different sub-streams, and sends the data to the client by using the sub-stream path specified in step 305; and the client receives the data transmitted by the server by using the different sub-streams, and re-integrates the received data.

Step 307: When data transmission is not completed, the server periodically determines whether a current transmission path and a current quantity of sub-streams are optimal, and makes a decision, such as a decision to increase a quantity of sub-streams, reduce a quantity of sub-streams, or modify a transmission path.

In a possible design, the server periodically obtains an actual transmission rate of multi-stream transmission; and when the actual transmission rate of multi-stream transmission is greater than a sub-stream deletion transmission rate threshold, the server determines, if a requirement for a transmission rate threshold is satisfied, a quantity of sub-streams and a sub-stream path that need to be closed; and sends the closed sub-stream path and corresponding sub-stream identification information to the SDN controller; or when the actual transmission rate of multi-stream transmission is less than a sub-stream addition transmission rate threshold, the server determines, if a requirement for the transmission rate threshold is satisfied, a quantity of sub-streams and a sub-stream path that need to be added; allocates corresponding sub-stream identification information to each added sub-stream; and sends the added sub-stream path and the corresponding sub-stream identification information to the SDN controller.

It should be noted that the actual transmission rate of multi-stream transmission is determined by a sum of transmission rates of all sub-streams. In specific implementation, the actual transmission rate of multi-stream transmission may be determined according to a sum of sending rates of all sub-stream sending buffers.

Step 308: The server sends, to the SDN controller, the decision such as increasing the quantity of sub-streams, reducing the quantity of sub-streams, or modifying the transmission path determined in step 307, so that the SDN controller configures the related network device.

For example, if the SDN controller deletes, in the network device 00:00:00:00:00:00:00:01 by using the northbound interface of the REST API type, routing information whose name is flow-mod-1 and that is configured in step 305, a related command is curl -X DELETE -d '{"name":"flow-mod-1"}' http://192.168.0.1:8080/wm/staticflowentry-pusher/json.

Step 309: The server plans to-be-sent data to different sub-streams, and sends the data to the client by using the sub-stream path specified in step 308; and the client receives the data transmitted by the server by using the different sub-streams, and re-integrates the received data.

For example, if the server determines three sub-stream transmission paths in step 304, and obtains two sub-stream transmission paths after deleting one sub-stream transmission path in step 307, the server continues to send the data to the client by using the two sub-stream transmission paths.

In this embodiment of the present disclosure, the server completes multi-stream connection path planning according to the network status information, and the SDN controller only provides the network status information for the server without performing the multi-stream connection path planning, so that calculation load of the SDN controller is reduced. In addition, the server performs the multi-stream connection path planning according to the network status information, so that the quantity of sub-streams can be more efficiently adjusted in a data transmission process to satisfy the sending rate requirement of the client.

Figure 4:
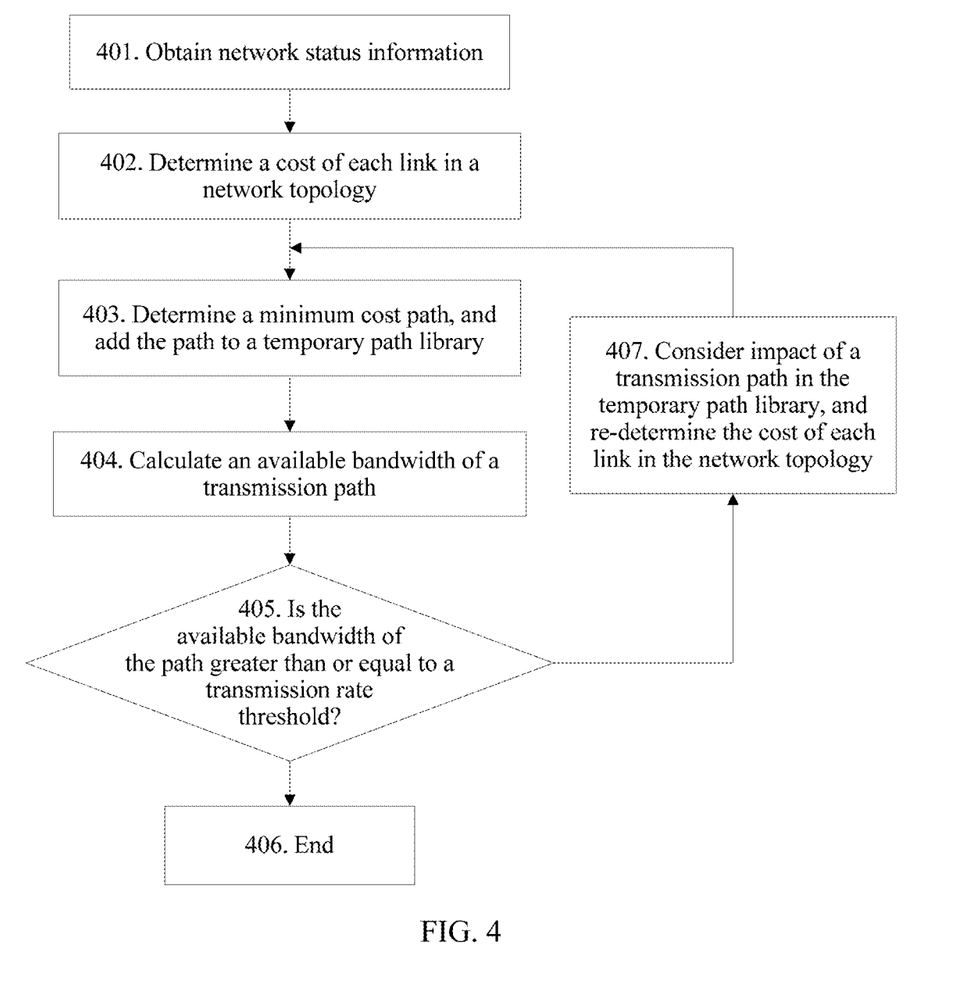
FIG. 4 is a flowchart of a method in which a server determines a quantity of sub-streams and a sub-stream transmission path that are required by a multi-stream connection according to an embodiment of the present disclosure.

FIG. 4 is a flowchart of a method in which a server determines a quantity of sub-streams and a sub-stream transmission path that are required by a multi-stream connection according to an embodiment of the present disclosure. FIG. 4 is a specific implementation of the embodiment shown in FIG. 3, and mainly relates to specific implementations of steps 304 and 307 in the embodiment shown in FIG. 3. As shown in FIG. 4, the method includes the following steps.

401. A server obtains network status information of an SDN network by using a northbound interface opened by an SDN controller.

The network status information includes a network topology and an available bandwidth and a delay that are of a link that is between adjacent network devices and that is in the network topology. A method for obtaining the network status information by the server is the same as that of steps 302 and 303 in the embodiment shown in FIG. 3. Details are not described herein again.

402. The server calculates a cost of each link in a network topology according to an available bandwidth and a delay that are of a link in the network topology.

The calculating, by the server, a cost of each link in the network topology according to an available bandwidth and a delay that are of a link in the network topology is specifically:

$$O(D_i, B_i) = a_1 \times D_i + (1-a_1)/B_i, \text{ where}$$

$O(D_i, B_i)$ is a cost of a link $L_i$, $a_1$ is a constant greater than or equal to 0 and less than or equal to 1, $D_i$ is a delay of the link $L_i$, and $B_i$ is an available bandwidth of the link $L_i$.

403. Calculate a minimum cost path that is between a source address (that is, an IP address of the server) and a destination address (that is, an IP address of a client) and that is in the network topology by using a minimum cost path calculation algorithm, use the minimum cost path as a first transmission path, and add the first transmission path to a temporary path library.

In a possible design, the server may use a Dijkstra algorithm to calculate the minimum cost path.

404. Determine an available bandwidth of the first transmission path.

Specifically, a specific method for determining an available bandwidth of a transmission path is familiar to a person skilled in the art, and is not limited in this embodiment of the present disclosure. In a possible design, a minimum available bandwidth of all links on the path is used as an available bandwidth (that is, min(link 1, link 2, . . . , and link N)) of the path, or more accurate estimation is performed with reference to data such as a delay and a packet loss. For example, if there are three links in total on a path, and available bandwidths of the three links are respectively 20 Mbps, 30 Mbps, and 40 Mbps, an available bandwidth of the path is estimated to be min(20, 30, 40)=20 Mbps according to a minimum available bandwidth of all links on the path.

405. Determine whether an available bandwidth of a transmission path in the temporary path library is greater than a transmission rate threshold; and if the available bandwidth of the transmission path in the temporary path library is greater than the transmission rate threshold, end a procedure, or if the available bandwidth of the transmission path in the temporary path library is not greater than the transmission rate threshold, proceed to step 407 and end a procedure.

The transmission rate threshold is determined by a sending rate requirement, for example, $B_{tran} = \lambda \times B_{need}$, where $B_{tran}$ is a transmission rate threshold, $B_{need}$ is a sending rate requirement, and $\lambda$ is a constant greater than 1, so as to reduce impact of an estimation error of the available bandwidth of the transmission path on a decision result.

406. End a procedure.

407. Consider impact of the transmission path in the temporary path library, and re-determine the cost of each link in the network topology.

Specifically, when the available bandwidth of the transmission path in the temporary path library is less than the transmission rate threshold, it indicates that the sending rate requirement cannot be satisfied by using a sub-stream corresponding to the transmission path in the temporary path library. In this case, a sub-stream needs to be added to ensure the transmission rate requirement. Because the sub-stream corresponding to the transmission path put into the temporary path library has occupied a corresponding link bandwidth in the network topology, it is necessary to consider impact of the transmission path in the temporary path library on an available bandwidth of a link in the network topology when another transmission path is further planned.

Steps 403, 404, 405, and 407 are repeatedly performed until the available bandwidth of the transmission path in the temporary path library is greater than or equal to the transmission rate threshold.

In this embodiment of the present disclosure, the server obtains the network status information of the SDN network by using the SDN controller, and plans a transmission path based on the status information of the SDN network and the transmission rate threshold. Because a bandwidth estimation method is used to make decisions on a quantity of sub-streams and a sub-stream transmission path, there is no need to wait until all sub-streams are established one by one to make a decision on whether to add a new sub-stream, thereby avoiding wait time of multiple TCP slow start processes. Therefore, a decision process is faster.

Figure 5:
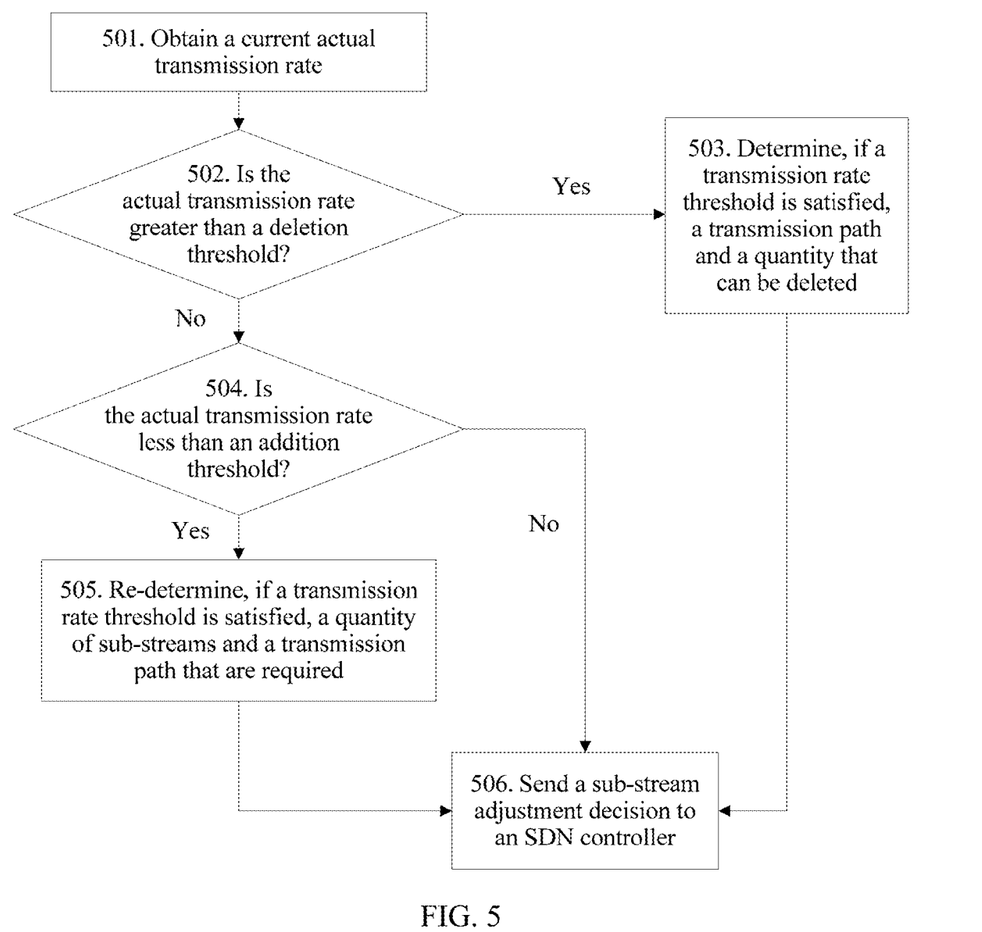
FIG. 5 is a flowchart of a method in which a server dynamically adjusts a quantity of sub-streams and a transmission path in a transmission process according to an embodiment of the present disclosure.

Because a network status change is a dynamic process, an available bandwidth of a path may suddenly decrease during network congestion, and the available bandwidth of the path may increase when other data transmission on a path ends. Therefore, a quantity of sub-streams and a transmission path that are determined when multi-stream transmission is just established may no longer satisfy a requirement for the transmission rate threshold after a period of time. In this case, the quantity of sub-streams and the transmission path need to be dynamically adjusted. FIG. 5 is a flowchart of a method in which a server dynamically adjusts a quantity of sub-streams and a transmission path in a transmission process according to an embodiment of the present disclosure.

Step 501: A server periodically obtains a current actual transmission rate.

Specifically, the actual transmission rate may be obtained by measuring a sum of sending rates of all sub-stream sending buffers.

Step 502: Determine whether the actual transmission rate of data sent by the server to a client is greater than a deletion threshold.

The deletion threshold is usually greater than a data transmission rate threshold, for example, may be 1.2 times a transmission rate, so as to avoid frequently adjusting a quantity of sub-streams and a transmission path.

Step 503: Determine, if a transmission rate threshold is satisfied, a transmission path and a quantity of sub-streams that can be deleted.

When the actual transmission rate of the data sent by the server to the client is greater than the deletion threshold, it indicates that an available bandwidth of a current multi-stream transmission path is greater than an actual requirement of the client. For an operator, there is a waste of network resources. In this case, some sub-streams may be considered to be deleted.

In a possible design, the server estimates one by one whether a total transmission rate of a multi-stream connection satisfies a requirement for the transmission rate threshold when a current minimum transmission rate path is deleted; and if the total transmission rate of the multi-stream connection satisfies the requirement for the transmission rate threshold when the current minimum transmission rate path is deleted, the server adds the minimum transmission rate path to a to-be-deleted path library, and continues to estimate whether the total transmission rate of the multi-stream connection satisfies the requirement for the transmission rate threshold when a minimum transmission rate path in a remaining path is deleted, until the total transmission rate of the multi-stream connection does not satisfy the requirement for the transmission rate threshold when the minimum transmission rate path in the remaining path is deleted.

Step 504: Determine whether the actual transmission rate is less than an addition threshold.

The addition threshold is usually less than the data transmission rate threshold, for example, may be 0.8 times the transmission rate, so as to avoid frequently adjusting the quantity of sub-streams and the transmission path.

Step 505: Re-determine, if a transmission rate threshold is satisfied, a quantity of sub-streams and a transmission path that are required.

A specific method is shown in the embodiment shown in FIG. 4. Details are not described herein again.

In a possible design, the server further determines whether a re-determined quantity of sub-streams is greater than a current quantity of sub-streams; and if the re-determined quantity of sub-streams is greater than the current quantity of sub-streams, it indicates that even if path planning is re-performed, the transmission rate threshold cannot be satisfied by using a fewer quantity of sub-streams. Therefore, a quantity of sub-streams and a transmission path can be first added on the basis of an existing path.

Step 506: The server sends a sub-stream adjustment decision to an SDN controller, so that the SDN controller configures a related network device.

It should be noted that a specific value relationship between the addition threshold and the transmission rate threshold and a specific value relationship between the deletion threshold and the transmission rate threshold may be determined by a service agreement (for example, SLA, Service Level Agreement) signed by a client user and an operator.

In this embodiment of the present disclosure, the quantity of sub-streams and the transmission path are dynamically adjusted, and impact of a network status change on multi-stream transmission is considered, so as to effectively ensure user server quality while considering operator's interests.

Figure 6:
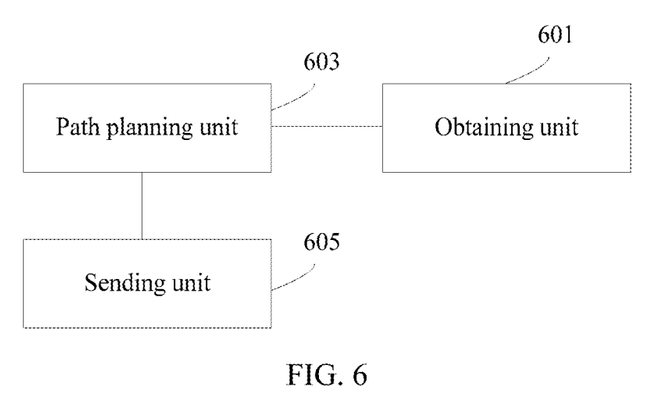
FIG. 6 is a schematic structural diagram of a server according to an embodiment of the present disclosure.

An embodiment of the present disclosure further describes a schematic structural diagram of a server that belongs to a same disclosure concept as the foregoing method embodiments. As shown in FIG. 6, the server 600 is configured to execute functions of the servers in the foregoing method embodiments of FIG. 3 to FIG. 5, and includes a obtaining unit 601, a path planning unit 603, and a sending unit 605.

The obtaining unit 601 is configured to obtain network status information of a network by using an SDN controller. The path planning unit 603 is configured to determine, according to the network status information and a data sending rate requirement of a client, a quantity of sub-streams and a sub-stream transmission path that are required by a multi-stream connection, and allocate corresponding sub-stream identification information to each sub-stream. The sending unit 605 is configured to send the determined sub-stream transmission path and the corresponding sub-stream identification information to the SDN controller.

Optionally, the network status information includes a network topology and an available bandwidth and a delay that are of a link that is between adjacent network devices and that is in the network topology; and that the path planning unit 603 is configured to determine, according to the network status information and a data sending rate requirement of a client, a quantity of sub-streams and a sub-stream transmission path that are required by a multi-stream connection is specifically: calculating a cost of each link in the network topology according to the available bandwidth and the delay that are of the link in the network topology; determining a first transmission path according to the cost of each link in the network topology, and determining whether an available bandwidth of the first transmission path is greater than a transmission rate threshold, where the transmission rate threshold is determined by the sending rate requirement, and the transmission rate threshold is greater than the sending rate requirement; if the available bandwidth of the first transmission path is greater than the transmission rate threshold, ending a procedure, or if the available bandwidth of the first transmission path is not greater than the transmission rate threshold, adding the first transmission path to a temporary path library, updating the cost of each link in the network topology according to the first transmission path, determining another transmission path according to an updated cost of each link, and determining whether a sum of an available bandwidth of the another transmission path and an available bandwidth of a transmission path in the temporary path library is greater than the transmission rate threshold; and if the sum of the available bandwidth of the another transmission path and the available bandwidth of the transmission path in the temporary path library is greater than the transmission rate threshold, ending a procedure, or if the sum of the available bandwidth of the another transmission path and the available bandwidth of the transmission path in the temporary path library is not greater than the transmission rate threshold, repeatedly performing the process until the sum of the available bandwidth of the another transmission path and the available bandwidth of the transmission path in the temporary path library is greater than the transmission rate threshold.

In a possible implementation, to adjust multi-stream transmission in a data transmission process, the obtaining unit 601 is further configured to periodically obtain an actual transmission rate of multi-stream transmission; the path planning unit 603 is further configured to: when the actual transmission rate of multi-stream transmission is greater than a sub-stream deletion transmission rate threshold, determine, if a requirement for the transmission rate threshold is satisfied, a quantity of sub-streams and a sub-stream path that need to be closed; and the sending unit 605 is further configured to send the closed sub-stream path and corresponding sub-stream identification information to the SDN controller; or the path planning unit 603 is further configured to: when the actual transmission rate of multi-stream transmission is less than a sub-stream addition transmission rate threshold, determine, if a requirement for the transmission rate threshold is satisfied, a quantity of sub-streams and a sub-stream path that need to be added; and allocate corresponding sub-stream identification information to each added sub-stream; and the sending unit 605 is further configured to send the added sub-stream path and the corresponding sub-stream identification information to the SDN controller.

In a possible design, that the path planning unit 603 calculates the cost of each link in the network topology according to the available bandwidth and the delay that are of the link in the network topology is specifically:

$$O(D_i, B_i) = a_1 \times D_i + (1-a_1)/B_i, \text{ where}$$

$O(D_i, B_i)$ is a cost of a link $L_i$, $a_1$ is a constant greater than or equal to 0 and less than or equal to 1, $D_i$ is a delay of the link $L_i$, and $B_i$ is an available bandwidth of the link $L_i$.

It should be noted that the sub-stream identification information is determined by an IP address of the server, a port number of the server, an IP address of the client, and/or a port number of the client.

In this embodiment, the server 600 is presented in a form of a function unit. The "unit" herein may be an application-specific integrated circuit (application-specific integrated circuit, ASIC), a circuit, a processor that executes one or more software or firmware programs and a memory, an integrated logic circuit, and/or another device that may provide the foregoing functions. In a simple embodiment, a person skilled in the art may figure out that the server 600 may be in a form shown in FIG. 2. The obtaining unit 601, the path planning unit 603, and the sending unit 605 may be implemented by using the processor and the memory in FIG. 2. Specifically, the obtaining unit 601 and the sending unit 605 may be implemented by executing the interaction module by the processor, and the path planning unit 603 may be implemented by executing the path planning module by the processor.

An embodiment of the present disclosure further provides a computer storage medium, and the computer storage medium includes a program designed for executing the foregoing method embodiments.

It should be noted that, to make the description brief, the foregoing method embodiments are expressed as a series of actions. However, a person skilled in the art should appreciate that the present disclosure is not limited to the described action sequence, because according to the present disclosure, some steps may be performed in other sequences or performed simultaneously. In addition, a person skilled in the art should also appreciate that all the embodiments described in the specification are example embodiments, and the related actions and modules are not necessarily mandatory to the present disclosure.

Although the present disclosure is described with reference to the embodiments, in a process of implementing the present disclosure that claims protection, a person skilled in the art may understand and implement another variation of the disclosed embodiments by viewing the accompanying drawings, disclosed content, and the accompanying claims. In the claims, "comprising" (comprising) does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

A person skilled in the art should understand that the embodiments of the present disclosure may be provided as a method, an apparatus (device), or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a CD-ROM, an optical memory, and the like) that include computer-usable program code. The computer program is stored/distributed in a proper medium and is provided as or used as a part of the hardware together with another hardware, or may also use another allocation form, such as by using the Internet or another wired or wireless telecommunications system.

The present disclosure is described with reference to the flowcharts and/or block diagrams of the method, the apparatus (device), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although the present disclosure is described with reference to specific features and the embodiments thereof, obviously, various modifications and combinations may be made to them without departing from the scope of the present disclosure. Correspondingly, the specification and accompanying drawings are merely examples of the present disclosure defined by the accompanying claims, and is considered as any of or all modifications, variations, combinations or equivalents that cover the scope of the present disclosure. Obviously, a person skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A multi-stream transmission method in a software defined network (SDN), the method comprising:
   obtaining, by a server, network status information of a network from an SDN controller, wherein the network status information comprises a network topology, and wherein the network status information further comprises an available bandwidth and a delay of a link that is between adjacent network devices and in the network topology;
   determining, according to the network status information and a data sending rate requirement of a client, a quantity of sub-streams and a sub-stream transmission path that are required by a multi-stream connection, and allocating corresponding sub-stream identification information to each sub-stream, wherein the quantity of sub-streams and sub-stream transmission path are determined based on the available bandwidth and the delay of the link that is between adjacent network devices and in the network topology; and
   sending; by the server, the determined sub-stream transmission path and e corresponding sub-stream identification information to the SDN controller.

2. The method according to claim 1, wherein:
   the network status information comprises a network topology;
   the network status information comprises an available bandwidth and a delay of a link that is between adjacent network devices and in the network topology; and
   determining, according to the network status information and a data sending rate requirement of a client, a quantity of sub-streams and a sub-stream transmission path that are required by a multi-stream connection comprises:
      calculating, by the server, a cost of each link in the network topology according to the available bandwidth and the delay that are of the link in the network topology,
      determining a first transmission path according to the cost of each link in the network topology, and adding the first transmission path to a temporary path library,
      determining whether an available bandwidth of a transmission path in the temporary path library is greater than a transmission rate threshold, wherein the transmission rate threshold is determined by the sending rate requirement, and the transmission rate threshold is greater than the sending rate requirement,
      when the available bandwidth of the transmission path in the temporary path library is greater than the transmission rate threshold, ending a procedure, and
      when the available bandwidth of the transmission path in the temporary path library is not greater than the transmission rate threshold, performing an iterative step, wherein the iterative step comprises:
         updating the cost of each link in the network topology according to the transmission path in the temporary path library;
         determining another transmission path according to an updated cost of each link; and
         determining whether a sum of an available bandwidth of the another transmission path and the available bandwidth of the transmission path in the temporary path library is greater than the transmission rate threshold;
      when the sum of the available bandwidth of the another transmission path and the available bandwidth of the transmission path in the temporary path library is greater than the transmission rate threshold, ending a procedure;
      when the sum of the available bandwidth of the another transmission path and the available bandwidth of the transmission path in the temporary path library is not greater than the transmission rate threshold, repeatedly performing the iterative step until the sum of the available bandwidth of the another transmission path and the available bandwidth of the transmission path in the temporary path library is greater than the transmission rate threshold.

3. The method according to claim 1, further comprising:
   periodically obtaining, by the server, an actual transmission rate of multi-stream transmission;
   when the actual transmission rate of multi-stream transmission is greater than a sub-stream deletion transmission rate threshold, determining, if a requirement for the transmission rate threshold is satisfied, a quantity of sub-streams and a sub-stream path that need to be closed, and sending the closed sub-stream path and corresponding sub-stream identification information to the SDN controller; and
   when the actual transmission rate of multi-stream transmission is less than a sub-stream addition transmission rate threshold, determining, if a requirement for the transmission rate threshold is satisfied, a quantity of sub-streams and a sub-stream path that need to be added, allocating corresponding sub-stream identification information to each added sub-stream, and sending the added sub-stream path and the corresponding sub-stream identification information to the SDN controller.

4. The method according to claim 2, wherein calculating, by the server, a cost of each link in the network topology according to the available bandwidth and the delay that are of the link in the network topology utilizes the following:

$$O(D_i, B_i) = a_1 \times D_i + (1-a_1)/B_i, \text{ where}$$

$O(D_i, B_i)$ is a cost of a link $L_i$, $a_1$ is a constant greater than or equal to 0 and less than or equal to 1, $D_i$ is a delay of the link $L_i$, and $B_i$ is an available bandwidth of the link $L_i$.

5. The method according to claim 1, wherein the sub-stream identification information is determined by an IP address of the server, a port number of the server, an IP address of the client, and a port number of the client.

6. A multi-stream transmission server for use in a software defined network (SDN), the server comprising:
  a processor; and
  a memory storing a computer readable program which, when executed by the processor, causes the server to:
    obtain network status information of a network from an SDN controller, wherein the network status information comprises a network topology, and wherein the network status information further comprises an available bandwidth and a delay of a link that is between adjacent network devices and in the network topology;
    determine, according to the network status information and a data sending rate requirement of a client, a quantity of sub-streams and a sub-stream transmission path that are required by a multi-stream connection, and allocate corresponding sub-stream identification information to each sub-stream, wherein the quantity of sub-streams and sub-stream transmission path are determined based on the available bandwidth and the delay of the link that is between adjacent network devices and in the network topology; and
    send the determined sub-stream transmission path and the corresponding sub-stream identification information to the SDN controller.

7. A multi-stream transmission system in a software defined network (SDN), the system comprising:
  an SUN controller;
  a server configured to:
    obtain network status information of a network from the SUN controller, wherein the network status information comprises a network topology, and wherein the network status information further comprises an available bandwidth and a delay of a link that is between adjacent network devices and in the network topology;
    determine, according to the network status information and a data sending rate requirement of a client, a quantity of sub-streams and a sub-stream transmission path that are required by a multi-stream connection, and allocate corresponding sub-stream identification information to each sub-stream, wherein the quantity of sub-streams and sub-stream transmission path are determined based on the available bandwidth and the delay of the link that is between adjacent network devices and in the network topology; and
    send the determined sub-stream transmission path and the corresponding sub-stream identification information to the SUN controller; and
  wherein the SDN controller is configured to:
    obtain the network status information,
    send the network status information to the server,
    receive the sub-stream transmission path and the corresponding sub-stream identification information that are sent by the server, and
    deliver a corresponding flow table to a network device in the network according to the sub-stream transmission path and the corresponding sub-stream identification information that are sent, by the server.

8. The system according to claim 7, wherein:
the network status information comprises a network topology;
the network status information comprises an available bandwidth and a delay of a link that is between adjacent network devices and in the network topology; and
the server is configured to:
  calculate a cost of each link in the network topology according to the available bandwidth and the delay that are of the link in the network topology,
  determine a first transmission path according to the cost of each link in the network topology,
  determine whether an available bandwidth of the first transmission path is greater than a transmission rate threshold, wherein the transmission rate threshold is determined by the sending rate requirement, and the transmission rate threshold is greater than the sending rate requirement,
  when the available bandwidth of the first transmission path is greater than the transmission rate threshold, ending a procedure,
  when the available bandwidth of the first transmission path is not greater than the transmission rate threshold, adding the first transmission path to a temporary path library, updating the cost of each link in the network topology according to the first transmission path, determining another transmission path according to an updated cost of each link, and determining whether a sum of an available bandwidth of the another transmission path and an available bandwidth of a transmission path in the temporary path library is greater than the transmission rate threshold, and
  when the sum of the available bandwidth of the another transmission path and the available bandwidth of the transmission path in the temporary path library is greater than the transmission rate threshold, ending a procedure; and
  when the sum of the available bandwidth of the another transmission path and the available bandwidth of the transmission path in the temporary path library is not greater than the transmission rate threshold, repeatedly performing the process until the sum of the available bandwidth of the another transmission path and the available bandwidth of the transmission path in the temporary path library is greater than the transmission rate threshold.

9. The system according to claim 7, wherein:
the server is further configured to:
  periodically obtain an actual transmission rate of multi-stream transmission;
  when the actual transmission rate of multi-stream transmission is greater than a sub-stream deletion transmission rate threshold, determine, if a requirement for the transmission rate threshold is satisfied, a quantity of sub-streams and a sub-stream path that need to be closed, and send the closed sub-stream path and corresponding sub-stream identification information to the SDN controller; and when the actual transmission rate of multi-stream transmission is less than a sub-stream addition transmission rate threshold, determine, if a requirement for the transmission rate threshold is satisfied, a quantity of sub-streams and a sub-stream path that need to be added, allocate corresponding sub-stream identification information to each added sub-stream, and send the added sub-stream path and the corresponding sub-stream identification information to the SDN controller; and the SDN controller is further configured to receive the closed sub-stream path and the corresponding sub-stream identification information that are sent by the server or the added sub-stream path and the corresponding sub-stream identification information that are sent by the server.

10. A multi-stream transmission method in a software defined network (SDN), the method comprising:

obtaining, by a server, network status information of a network from an SDN controller, wherein the network status information comprises a network topology, and wherein the network status information comprises an available bandwidth and a delay of a link that is between adjacent network devices and in the network topology;

determining, according to the network status information and a data sending rate requirement of a client, a quantity of sub-streams and a sub-stream transmission path that are required by a multi-stream connection, and allocating corresponding sub-stream identification information to each sub-stream; and sending, by the server, the determined sub-stream transmission path and the corresponding sub-stream identification information to the SDN controller, wherein the determining, according to the network status information and a data sending rate requirement of a client, a quantity of sub-streams and a sub-stream transmission path that are required by a multi-stream connection comprises:

calculating, by the server, a cost of each link in the network topology according to the available bandwidth and the delay that are of the link in the network topology;

determining a first transmission path according to the cost of each link in the network topology, and adding the first transmission path to a temporary path library;

determining whether an available bandwidth of a transmission path in the temporary path library is greater than a transmission rate threshold, wherein the transmission rate threshold is determined by the sending rate requirement, and the transmission rate threshold is greater than the sending rate requirement;

when the available bandwidth of the transmission path in the temporary path library is greater than the transmission rate threshold, ending a procedure; and when the available bandwidth of the transmission path in the temporary path library is not greater than the transmission rate threshold, performing an iterative step, wherein the iterative step comprises:

updating the cost of each link in the network topology according to the transmission path in the temporary path library;

determining another transmission path according to an updated cost of each link; and determining whether a sum of an available bandwidth of the another transmission path and the available bandwidth of the transmission path in the temporary path library is greater than the transmission rate threshold;

when the sum of the available bandwidth of the another transmission path and the available bandwidth of the transmission path in the temporary path library is greater than the transmission rate threshold, ending a procedure;

when the sum of the available bandwidth of the another transmission path and the available bandwidth of the transmission path in the temporary path library is not greater than the transmission rate threshold, repeatedly performing the iterative step until the sum of the available bandwidth of the another transmission path and the available bandwidth of the transmission path in the temporary path library is greater than the transmission rate threshold.

11. The method according to claim 10, further comprising:

periodically obtaining, by the server, an actual transmission rate of multi-stream transmission;

when the actual transmission rate of multi-stream transmission is greater than a sub-stream deletion transmission rate threshold, determining, if a requirement for the transmission rate threshold is satisfied, a quantity of sub-streams and a sub-stream path that need to be closed, and sending the closed sub-stream path and corresponding sub-stream identification information to the SDN controller; and when the actual transmission rate of multi-stream transmission is less than a sub-stream addition transmission rate threshold, determining, if a requirement for the transmission rate threshold is satisfied, a quantity of sub-streams and a sub-stream path that need to be added, allocating corresponding sub-stream identification information to each added sub-stream, and sending the added sub-stream path and the corresponding sub-stream identification information to the SDN controller.

12. The method according to claim 10, wherein calculating, by the server, a cost of each link in the network topology according to the available bandwidth and the delay that are of the link in the network topology utilizes the following:

$O(D_i, B_i) = a_1 \times D_i + (1-a_1)/B_i$, where $O(D_i, B_i)$ is a cost of a link $L_i$, $a_1$ is a constant greater than or equal to 0 and less than or equal to 1, $D_i$ is a delay of the link $L_i$, and $B_i$ is an available bandwidth of the link $L_i$.

13. The method according to claim 10, wherein the sub-stream identification information is determined by an IP address of the server, a port number of the server, an IP address of the client, and a port number of the client.

* * * * *